United States Patent Office 3,796,751
Patented Mar. 12, 1974

3,796,751
PREPARATION OF N-ACYL AMINO ALKANOIC ACIDS
Robert Fuhrmann, Morris Plains, Fred William Koff, Clifton, and John Pisanchyn, Morristown, N.J., assignors to Allied Chemical Corporation, New York, N.Y.
No Drawing. Filed Oct. 12, 1970, Ser. No. 80,188
Int. Cl. C07c 103/48
U.S. Cl. 260—534 R
9 Claims

ABSTRACT OF THE DISCLOSURE

A process for transforming an alkyl amino acid salt of a mineral acid into the corresponding N-acyl amino alkanoic acid comprising neutralizing the mineral acid portion. The ammonium salt is separated out by adding alkadroxide, separating out the thereby formed ammonium salt of the mineral acid, and acylating the remaining solution. The ammonium salt is separated out by adding alkanoic acid to the neutralized solution.

---

N-acyl amino alkanoic acids are generally prepared by the acylation of the corresponding amino acid, said amino acid usually being available as the amino acid salt of a mineral acid. Prior to acylation, the amino acid salt must be neutralized and the thereby resulting free amino acid separated from the neutralization product. The separation conventionally occurs by one of the following methods:

(1) A dilute aqueous solution of the amino acid salt is prepared and sent through ion exchange columns where any free mineral acid passes through unadsorbed. The free amino acid is recovered by desorbing the adsorbed amino acid salt from the column with aqueous ammonia. This produces a dilute aqueous solution of the amino acid and the ammonium salt of the mineral acid, thus requiring extensive concentration, as by evaporation, and fractionation for product recovery.

(2) A solution of the amino acid salt is treated with Ca(OH)$_2$ to form the free amino alkanoic acid. However, the treatment also produces an insoluble calcium salt of the mineral acid which occludes quantities of the amino alkanoic acid and thus requires thorough washing. A further disadvantage is that the large amounts of the calcium salt produced involve additional purification expenses.

SUMMARY OF THE INVENTION

It is an object of this invention to provide a facile process for transforming an amino acid salt of a mineral acid into the corresponding N-acyl amino alkanoic acid.

It is another object to provide a method for separating the free amino acid from the neutralization product prior to acylation thereof following neutralization of the amino acid salt.

It is a more specific object to provide a method of producing N-acetyl amino caproic acid from caprolactam.

It has now been found in accordance with the instant invention in the process for transforming an amino acid salt of a mineral acid having the formula $$[HOOC\text{---}C_nH_{2n}NH_3]_p{}^+X \qquad (I)$$

into an N-acyl amino alkanoic acid of the formula $$HOOC\text{---}C_nH_{2n}NHCOR \qquad (II)$$

which comprises neutralizing the mineral acid portion of the amino acid salt, separating the resultant free amino acid from the mineral acid salt of the neutralizing agent, and acylating the free amino acid. When the neutralizing agent is ammonium hydroxide, the ammonium salt formed can be readily separated from the free amino acid by the addition of an alkanoic acid, said ammonium salt being insoluble in the alkanoic acid.

In the above formulas R is an alkyl radical, straight chain or branched, of 1 to 16 carbon atoms, X is an anion selected from the group consisting of Cl$^-$, HSO$_4{}^-$, SO$_4{}^=$, H$_2$PO$_4{}^-$, HPO$^=$, PO$_4{}^\equiv$, R'SO$_3{}^-$, R' being selected from the group consisting of alkyl radicals of 1 to 6 carbon atoms, and aryl, alkaryl, or aralkyl radicals of 6 to 8 carbon atoms; $n$ is an integer from 2 to 20, preferably from 4 to 12, and $p$ is an integer from 1 to 3 and is equal to the negative charge on anion X.

It is preferred that the instant process be used to produce an N-acyl amino caproic acid, most preferably N-acetyl amino caproic acid i.e. a compound of Formula II wherein $n=5$ and R=CH$_3$.

DETAILED DESCRIPTION OF THE INVENTION

In the production of N-acyl amino alkanoic acids from the corresponding amino alkanoic acid salt of a mineral acid, the process steps include neutralization of the mineral acid portion of the amino acid salt with ammonium hydroxide, separation of the resultant free amino acid from the ammonium salt, and acylation of the free amino acid. In a preferred embodiment, the amino acid salt is obtained by the acid hydrolysis of the corresponding lactam. Using amino caproic acid sulfate as an example, the process of our invention can be represented as follows

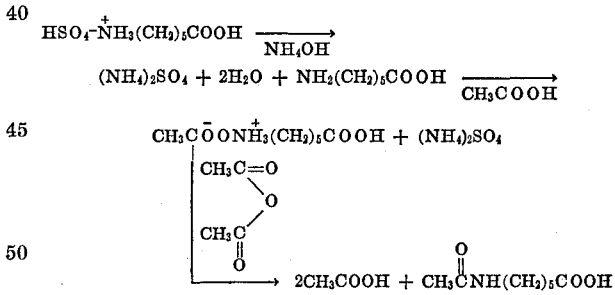

Each of these steps is discussed below in detail.

(1) Hydrolysis

Water, mineral acid and lactam are mixed together. Preferably the acid is added slowly to the water, and then the lactam is slowly added. The solution temperature can then be raised to from about 60° to about 200° C., preferably to about 125° to 150° C. The temperature is maintained for from about 0.25 to about 10 hours, preferably for from about 0.5 to about 4 hours, after which time the hydrolysis mixture is usually cooled to below 50° C., preferably to about room temperature.

The above hydrolysis step is illustrated by the following equation wherein the lactam being hydrolyzed is ε-caprolactam and the hydrolyzing agent is sulfuric acid.

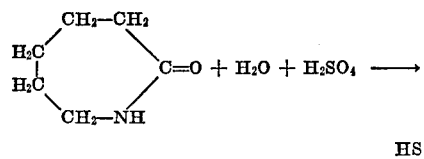

The mole ratio of water to lactam in the hydrolysis step generally ranges from about 1:1 to about 5:1, preferably from about 1.1:1 to about 2:1.

The mole ratio of sulfuric acid to lactam ranges from about 0.5:1 to about 2:1, preferably from about 0.5:1 to 1:1.

In the above hydrolysis step, the following acids may be substituted for the preferred sulfuric acid on an acid equivalent basis: hydrochloric acid, phosphoric acid, and an organic sulfonic acid of the formula R'SO$_3$ wherein R' is as heretofore defined.

Generally, the lactam reactant contains up to 18 carbon atoms, preferably up to 12 carbon atoms.

(2) Neutralization

Ammonium hydroxide is used to neutralize the mineral acid portion of the amino alkanoic acid salt. The amino alkanoic acid salt can be in the solid form, in aqueous solution or in solution in the above described hydrolysis mixture. When available in the solid form it may be mixed directly with ammonium hydroxide or it may be put into solution prior to contacting it with the ammonium hydroxide. Suitable solvents for the amino alkanoic acid salt include water and those mineral acids from which the X anion is derived, i.e. H$_2$SO$_4$, H$_3$PO$_4$, R'HSO$_3$, etc., wherein X and R' are as defined herein above. Preferably the hydrolysis mixture or amino alkanoic acid salt solution is added to the ammonium hydroxide so as to obtain a slurry of lower liquid viscosity.

The ammonium hydroxide should be used in an amount just sufficient to neutralize all the mineral acid present, whether said mineral acid is present as free acid or as the salt of the amino acid, and not in an amount as would be sufficient to also neutralize the carboxylic acid group of the amino acid. Since the mineral acid is of course stronger it is always neutralized first. The ammonium hydroxide should be as concentrated as possible so as to minimize the amount of water thus added. Generally the concentration of the ammonium hydroxide ranges from 15 wt. percent to anhydrous, preferably from 36 wt. percent to anhydrous. Gaseous ammonia can also be used if desired.

During the neutralization step the temperature of the solution is generally maintained at about $-10°$ up to about 100° C. preferably at about 25° to about 50° C.

(3) Separation of ammonium sulfate

A particular significant improvement over prior art processes comprises the addition of an alkanoic acid to the neutralized reaction mixture in an amount sufficient to dissolve the free amino acid. Generally the weight ratio of alkanoic acid to reaction mixture ranges from about 0.5:1 to about 15:1, preferably from about 1.5:1 to about 6:1. When the alkanoic acid is acetic acid, the weight ratio generally ranges from about 0.5:1 to about 5:1, preferably from about 1.5:1 to about 3:1. The temperature during this step can range from about 10° C. up to about 120° C., preferably from about 20° C. to about 40° C. Generally the resulting solution should contain less than 40 weight percent water, preferably less than 20 weight percent water. Ammonium salts of mineral acids are essentially insoluble in the alkanoic acid and only slightly soluble in the mixture of alkanoic acid and amino acid, thus the inorganic acid ammonium salt, e.g., ammonium sulfate precipitates from the solution on addition of the alkanoic acid. The solution is then filtered to remove the ammonium sulfate. The filter cake may be washed, preferably with additional alkanoic acid to recover any occluded amino acid. Water is removed from the combined filtrates, as by distillation or flash evaporation, and some alkanoic acid may also be removed. Any hitherto unremoved ammonium sulfate will also precipitate and is separated from the solution by filtration.

The alkanoic acid contains from 2 to 17 carbon atoms, preferably from 2 to 6 carbon atoms. It is preferred that the alkanoic acid used corresponds to the acid anhydride used in the subsequent acylation step.

Illustrative of suitable alkanoic acids are

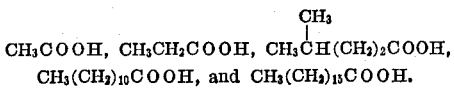

(4) Acylation

An acylating agent is added to the filtrate containing the amino alkanoic acid and alkanoic acid to provide the desired acyl groups. The solution is then heated and maintained at a temperature of about 50° to 200° C., preferably about 100° to 150° C., for about 0.25 to about 2.0 hours, preferably for about 0.25 to about 0.5 hour.

Preferably the acyl portion of the acylating agent contains from 2 to 17 carbon atoms, preferably from 2 to 6 carbon atoms.

The N-acyl amino alkanoic acid and excess acylating agent may then be removed from the N-acyl amino alkanoic acid by conventional methods, such as by distillation or flash evaporation at reduced pressure. If desired, the N-acyl amino alkanoic acid residue may be purified by conventional means.

Commonly used acylating agents are alkanoic acid anhydrides and acid chlorides, examples of which are

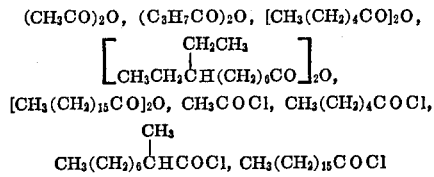

In a preferred embodiment the acylating agents are acetyllating agents such as acetic anhydride and acetyl chloride. In such case, it is preferred that the alkanoic acid used in the separation step also be acetic acid.

Illustrative of the mineral acid salts of amino acids which may be used in the process of this invention are the following:

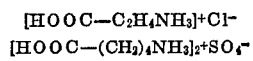

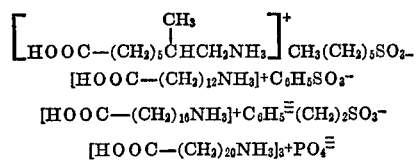

Illustrative of the N-acyl amino alkanoic acids which may be obtained by the process of this invention are the following:

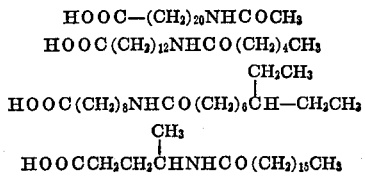

EXAMPLE 1

To 209 grams of 71 wt. percent sulfuric acid (3.02 equivalents) is slowly added with stirring 241 grams of ε-caprolactam (2.13 equivalents). After addition of the caprolactam, the temperature of the hydrolysis mixture was raised until reflux occurred. Hydrolysis was continued for 4 hours at a temperature of 125–150° C. After cooling to room temperature, a yellow viscous solution was obtained.

To this hydrolysis mixture (449 grams) was added slowly with stirring 220 grams of 23.3% ammonium hydroxide solution. The reaction mixture was cooled during the neutralization to maintain the temperature below 30° C. After the addition of the ammonium hydroxide, the neutralization mixture was stirred for one hour at room temperature. The ammonium hydroxide solution utilized was an amount sufficient to just neutralize all of the sulfuric acid (free and combined) but none of the amino acid.

To 670 grams of the neutralization mixture was added 901 grams of acetic acid, followed by filtration of the resultant slurry. The filter cake was washed three times with 100 ml. portions of acetic acid. The combined filtrates were then distilled at reduced pressure to remove water and a part of the acetic acid. A second portion of ammonium sulfate which precipitated was then filtered out.

To the filtrate which was essentially an acetic acid-amino caproic acid mixture, 254 grams (2.49 equivalents) of acetic anhydride was added. The mixture was then heated to reflux for 0.5 hour at a reflux temperature of 127° C. After cooling to room temperature, the reaction mixture was flash evaporated at reduced pressure (ca. 5 mm.) to remove the acetic acid and acetic anhydride. The solid residue (355 grams) was found by potentiometric titration to contain 94.9% N-acetyl amino caproic acid. The remainder was acetic acid and acetic anhydride.

EXAMPLE 2

The procedure of Example 1 was repeated to prepare 4-acetamido-butyric acid from 2-pyrollidone, with the exception that butyric acid was substituted for acetic acid and butyric anhydride for acetic anhydride. The overall yield of 4-acetamido-butyric acid was 81%.

We claim:
1. In a process for transforming a mineral acid salt of an amino alkanoic acid of the structure

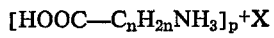

into an N-acyl amino alkanoic acid of the structure $HOOC-C_nH_{2n}NHCOR$ wherein R is an alkyl radical, straight chain or branched, of 1 to 16 carbon atoms; X is an anion selected from the group consisting of $Cl^-$, $HSO_4^-$, $SO_4^=$, $H_2PO_4^-$, $HPO_4^=$, $PO_4^{\equiv}$, and $R'SO_3^-$ wherein R' is selected from the group consisting of an alkyl radical of 1 to 6 carbon atoms, a benzene radical, an alkaryl radical of 6 to 8 carbon atoms and an aralkyl radical of 6 to 8 carbon atoms; n is an integer from 2 to 20, and p is an integer from 1 to 3 which is equal to the negative charge on said anion X, said process comprising
   (a) neutralizing the mineral portion of the amino acid salt with an amount of ammonium hydroxide sufficient to react at a temperature of from about 10° C. to about 120° C. with essentially all the mineral acid present either as a salt or as free mineral acid;
   (b) separating from the thus neutralized solution the ammonium salt of the mineral acid; and
   (c) acylating the amino alkanoic acid component of the neutralized solution with an acylating agent to form said N-acyl amino alkanoic acid;
the improvement which comprises precipitating the ammonium salt of the mineral acid by adding to the neutralized solution a sufficient amount of an alkanoic acid of 2 to 6 carbon atoms to dissolve the free amino acid component thereof; the weight ratio of alkanoic acid to neutralize solution ranges from about 0.5:1 to about 15:1; and the solution of step (b) contains less than about 40 weight percent water.

2. The process of claim 1 wherein n is an integer of 4 to 12 and R contains from 1 to 5 carbon atoms.

3. The process of claim 2 wherein the number of carbon atoms in the alkanoic acid is one more than the number of carbon atoms in radical R.

4. The process of claim 3 wherein X is $HSO_4^-$ or $Cl^-$.

5. The process of claim 3 wherein the mineral acid salt of the amino alkanoic acid is obtained by the acid hydrolysis of a lactam.

6. The process of claim 3 wherein the acid salt of the amino acid is

7. The process of claim 6 wherein X is $HSO_4^-$.

8. The process of claim 7 wherein R is methyl, said alkanoic acid is acetic acid.

9. The process of claim 8 wherein said acylating agent is acetic anhydride.

References Cited

UNITED STATES PATENTS

| | | | |
|---|---|---|---|
| 2,222,993 | 11/1940 | Toennies | 260—534R XR |
| 2,327,119 | 8/1943 | Martin | 260—534 |
| 2,462,009 | 2/1949 | Morris et al. | 260—534 XR |
| 2,579,851 | 12/1951 | Novotny | 260—534 XR |
| 3,113,966 | 12/1963 | Formaini et al. | 260—534 R |
| 3,362,969 | 1/1968 | Tsuchihara | 260—534 XR |
| 3,655,748 | 4/1972 | Tandara | 260—534 R |
| 2,681,927 | 6/1954 | McCollom et al. | 260—534 R |
| 2,453,234 | 11/1948 | Koch | 260—534 R |

OTHER REFERENCES

Kekenak: C. A. 68, 106653j (1968).
Naotake et al.: Chem. Abst. 69, 77735a (1968).
Koji et al.: Chem. Abst. 72, 79488h (1970).
Greenstein et al. "Chemistry of the Amino Acids," Wiley & Sons, N.Y. (1961), pp. 664–666.
Roberts et al. "Basic Principles of Organic Chemistry," W. A. Benjamin, Inc. (1965), p. 714.

LORRAINE A. WEINBERGER, Primary Examiner

J. F. TERAPANE, Assistant Examiner

U.S. Cl. X.R.

260—404, 534 C